United States Patent
Costa et al.

(10) Patent No.: US 7,641,732 B2
(45) Date of Patent: *Jan. 5, 2010

(54) USE OF NEW FAST-SETTING MORTARS FOR PREPARING PRODUCTS BY MEANS OF POURING IN FOUNDRY EARTH MOULDS

(75) Inventors: Umberto Costa, Bergamo (IT); Roberto Cucitore, Bergamo (IT)

(73) Assignee: Italcementi S.p.A., Bergamo (IT)

( * ) Notice: Subject to any disclaimer, the term of this patent is extended or adjusted under 35 U.S.C. 154(b) by 453 days.

This patent is subject to a terminal disclaimer.

(21) Appl. No.: 10/589,156

(22) PCT Filed: Feb. 8, 2005

(86) PCT No.: PCT/IB2005/000306

§ 371 (c)(1),
(2), (4) Date: Aug. 10, 2006

(87) PCT Pub. No.: WO2005/080288

PCT Pub. Date: Sep. 1, 2005

(65) Prior Publication Data

US 2007/0163471 A1      Jul. 19, 2007

(30) Foreign Application Priority Data

Feb. 12, 2004   (IT) .......................... MI2004A0228

(51) Int. Cl.
*C04B 28/00*   (2006.01)
(52) U.S. Cl. .................. 106/713; 106/717; 106/724; 106/737; 106/823
(58) Field of Classification Search .............. 106/713, 106/717, 737, 724, 823
See application file for complete search history.

(56) References Cited

U.S. PATENT DOCUMENTS 6,802,898 B1   10/2004   Liskowitz et al. ............ 106/705
7,300,514 B2 *  11/2007  Bonafous et al. ............. 106/712

FOREIGN PATENT DOCUMENTS

DE         197 04 066 A1    8/1998

OTHER PUBLICATIONS

International Search Report dated Oct. 18, 2005 from PCT/IB2005/000306.

* cited by examiner

*Primary Examiner*—Paul Marcantoni
(74) *Attorney, Agent, or Firm*—Ohlandt, Greeley, Ruggiero & Perle, L.L.P.

(57) ABSTRACT

Described herein is the use of new cementitious mortars with a high degree of fluidity and short consolidation times in the production of cementitious products by means of pouring in foundry moulds. The mortars used contain water, a fast-setting cement, fluidifiers and/or superfluidifiers, setting regulators, and aggregates having a specific granulometric distribution. The aggregates are made up of two fractions with different grain size such that the ratio between the characteristic grain diameters of the two fractions is comprised between 2.2 and 3.2. The new mortars thus obtained have values of fluidity 2-3 times higher than those of mortars produced with traditional aggregates. The mortars thus produced are particularly suitable for filling, in a homogeneous way and without any application of vibration, foundry earth moulds; solidification in the moulds takes place in a short time and leads to the formation of products, including ones of a complex shape, with precise outlines and having good mechanical characteristics.

8 Claims, 1 Drawing Sheet

USE OF NEW FAST-SETTING MORTARS FOR PREPARING PRODUCTS BY MEANS OF POURING IN FOUNDRY EARTH MOULDS

FIELD OF THE INVENTION

The present invention relates to the field of preparation of cementitious products by means of pouring in moulds. Described herein is the use of new mortars with a high degree of fluidity and a rapid development of resistances in the preparation of products by means of pouring in foundry earth moulds.

PRIOR ART

Pourable mortars are liquid compositions characterized by a high degree of fluidity. They are used in the cement sector for specific applications in which a very fluid mix is required, which is able to reach crevices and narrow spaces to fill them in a homogeneous way and solidify therein. Examples of said applications are the recovery of deteriorated building works, consolidation of rock formations, structural reinforcement, injection in the conduits of tendons, immobilization of toxic-noxious refuse (e.g., asbestos), and the production of cementitious products for pouring in moulds.

Pourable mortars in general consist of hydraulic binders, aggregates having a grain diameter not greater than 4 mm, water, and possibly, added substances and additives. Amongst the additives there may be listed: fludifiers, superfluidifiers, setting correctors, substances that facilitate adhesion to the substrate, air-entraining agents, expansive agents, etc.

Examples of pourable cementitious mortars known in the state of the art are "Mapegrout colabile" (manufactured by Mapei S.p.A.) and "Malta antiritiro reoplastica autolivellante" (self-levelling rheoplastic anti-shrink mortar) (manufactured by Siriobeton A.C); "Macflow Rheomac 200" (manufactured by MAC S.p.A.) is marketed as specific binder for the manufacture of pourable mortars.

The performance of the mortars in the fresh state is evaluated using testing methods for measuring spreading by means of a vibrating table (UNI 7044-72) or for determining consistency by means of a funnel groove (UNI 8997). Both of the methods provide an indication of the consistency through the measurement of a dimension characteristic of the area occupied by a pre-set volume of mortar on a horizontal plane and in defined conditions of testing.

The high degree of fluidity of pourable mortars, albeit desirable for the applications referred to above, can also present some disadvantages; for example in the case of consolidation of vertical or inclined surfaces, the mortar, once applied, tends to be dispersed from the site of application before hardening. In the case of the moulding of products, a great deal of time is required before the fluid mass solidifies and develops resistance such as to enable recovery of the solidified product. Such techniques are consequently limited to obtaining products of a substantially linear shape, and in any case call for considerable times before the product in the hardened state can be recovered.

Said problems are particularly acute in the case of the process of pouring in moulds described in the patent No. WO03008166. This process envisages moulding cementitious products by means of pouring of mortar into foundry moulds. After solidification in the mould, the product is recovered, the moulds destroyed, and the sand recycled to form new moulds, to be used for a new casting. These plants, which are usually designed for the casting of molten metal, do not envisage the application of vibrations for compacting the casting mass; consequently, the complete filling of the moulds and compacting of the cementitious mix must be entrusted only to the characteristics of fluidity of the mortar. The technology of casting in earth moulds envisages two different modalities of casting: 1. open moulding; 2. using a sprue. In the first case the mould consists of just one element having a face completely open and facing upwards. In the second case, instead, the mould is made up of two halves fitted together, and the material must flow through a sprue to be able to fill the mould. In both cases it is necessary for the mortar to have a high capacity for compacting only on account of its weight, without any segregation; it is likewise useful for the mass, once applied, to solidify rapidly.

There exists therefore the need to render industrially effective the aforesaid process of pouring in foundry moulds. In particular, it would be useful to increase the rate of consolidation of the mortars used, without this having the repercussion of an undesired reduction in fluidity of the product, and at the same time safeguarding the mechanical properties of the hardened product, produced by means of pouring in foundry moulds.

Another need is to have available extremely fluid mortars, without resorting to large amounts of fluidifiers/superfluidifiers. The use of said additives in large quantities considerably increases the cost of the cementitious mix and can lead to modifications in the performance of the consolidated product.

SUMMARY

The present applicant has surprisingly found that by mixing with water a fast-setting cement, fluidifiers and/or superfluidifiers, setting regulators and aggregates having a specific granulometric distribution, mortars are obtained characterized by a high degree of fluidity and short consolidation times, which are particularly suitable for solving the problems described above.

The aggregates used are made up of two fractions with different grain size: specifically, the ratio between the characteristic grain diameters of the two fractions is comprised between 2.2 and 3.2 (said ratio is calculated by setting in the numerator the granulometric fraction with the larger diameter).

Each of the two fractions is preferably substantially monogranular, i.e., the particles that compose it have a negligible variation in diameter with respect to the characteristic value of the fraction. The mortars thus obtained have values of fluidity 2-3 times higher than those of mortars produced with granulometric distribution of traditional aggregates. Said increases in fluidity are obtained without modifying the water/cement ratio or the amount of fluidifiers used.

These characteristics render possible the production, in an effective and industrially advantageous way, of cementitious products obtained by means of pouring of mortars in foundry moulds: the high degree of fluidity of the mortar enables homogeneous filling of the moulds even without any need for vibration for compacting the mass. The high degree of fluidity does not interfere with the time of setting of the cement: consequently, after pouring, the composition hardens and develops the necessary resistance over a short time, thus enabling a faster recovery of the hardened product and a faster production cycle.

DETAILED DESCRIPTION OF THE INVENTION

Figure 1:
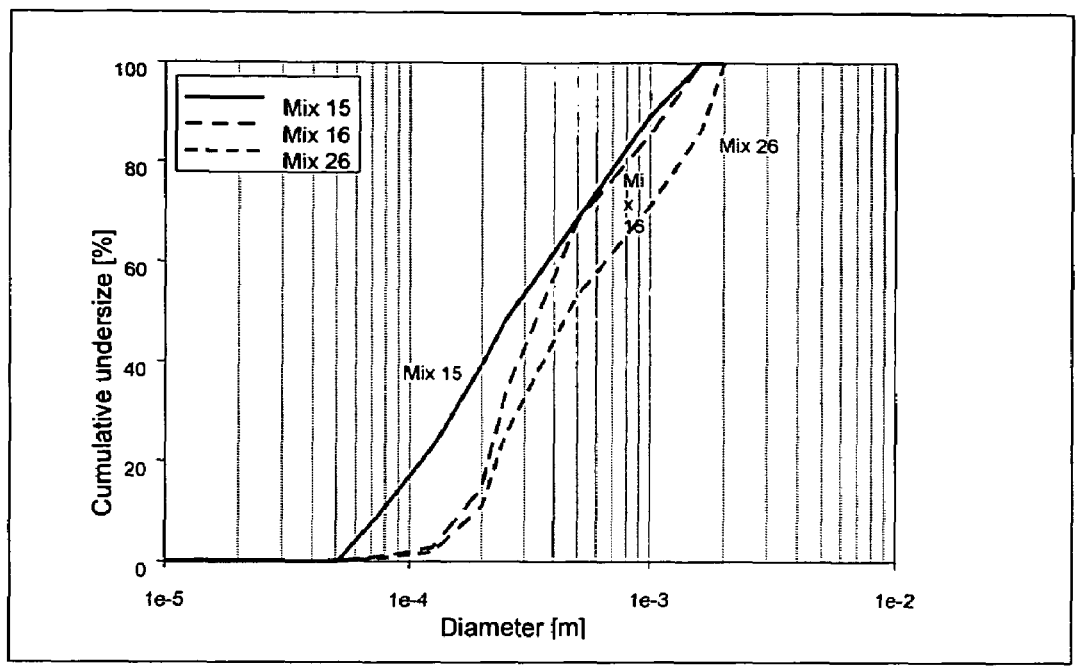
FIG. 1: granulometric distribution of the reference aggregates in Example 1

Pourable mortars used in the present invention for forming products in foundry moulds are obtained from dry premixes comprising a fast-setting hydraulic binder and aggregates. From the mineralogical standpoint, the aggregates are those commonly used in the preparation of concretes (e.g., sand) and are classified in the standard UNI 8520.

Said aggregates are not used as such in a coarse form, but are previously divided on the basis of the grain size. For the formation of the compositions in question two fractions of aggregates having specific grain sizes are used. Of determining importance is the fact that the ratio between the characteristic grain diameters of the two fractions of aggregates is comprised between 2.2 and 3.2, preferably between 2.5 and 3.0.

For the purposes of the present invention, by the term "characteristic grain diameter" for a given fraction of aggregates (also defined herein as $X_0$) is meant the mesh opening [expressed in mm] of the screen at which the cumulative undersize ($P_c$) for that given fraction is equal to 63.2%.

As regards the absolute value in millimetres of the characteristic grain diameter, useful and non-limiting ranges of reference are: between 0.2 mm and 0.4 mm for one fraction, and between 0.6 mm and 0.8 mm for the other fraction; however, any fraction having a characteristic grain diameter of up to 4 mm approximately may be used, provided that the dimensional ratio between the characteristic grain diameters of the two fractions is comprised between 2.2, and 3.2.

It has moreover been noted that the effectiveness of the invention increases, the more the fractions tend to be homogeneous in diameter, i.e., tending towards monogranularity. It is thus preferable that, for each fraction, there should be a minor variation in diameter with respect to the characteristic value. Monogranularity is conveniently expressed by the parameter n. The parameter n is obtained via the RRSB equation[1] (DIN 66145):

[1] RRSB: initials of Rosin, Ramler, Sperling and Bennet $$P_c = 100\left[1 - e^{-\left(\frac{x}{x_0}\right)^n}\right]$$

where:
$P_c$=cumulative undersize [%];
x=mesh opening of the screen [expressed in mm];
$x_0$=characteristic grain diameter [expressed in mm], as defined previously;
n=form parameter of the granulometric distribution.

According to the present invention the RSSB equation is used, applying the least-squares algorithm (see Comincioli, Analisi Numerica—Metodi Modelli Applicazioni—McGraw-Hill—1990, pp. 166-167), to interpolate the granulometric distribution determined experimentally and deducing as interpolation parameters the values of $x_0$ and n. The resulting values of $x_0$ and n, for a given distribution, are assumed as distinctive of said distribution. In particular, the parameter n is an index of the quantity of particles that, in a given granulometric distribution, are characterized by values of diameters different from $x_0$. In particular, as n increases, the number of particles having a diameter other than $x_0$ decreases and, consequently, the distribution tends to be monogranular, with a diameter tending to $x_0$. In particular, it is preferable that the parameter n should be greater than or equal to 4.0: said value indicates fractions that, for the purposes of the present invention, are considered substantially monogranular. It is moreover preferable that the two fractions be equally represented, i.e., that approximately one half of the total aggregates (wherein "approximately one half" means 40-60 wt % with respect to the total of the aggregates) be made up of the first fraction and the remaining half approximately (i.e., the corresponding 60-40 wt %) should consist of the second fraction.

With respect to the weight of the total dry premix, the aggregates are incorporated in a weight percentage of between 45 wt % and 65 wt %, preferably between 50 wt % and 54 wt %.

In the compositions according to the invention, any fast-setting hydraulic binder may be used. By "hydraulic binder" is meant a pulverized cementitious material in the solid, dry state, which, when mixed with water, yields plastic mixes capable of promoting setting and hardening. Fast-setting hydraulic binders are products in themselves known and widely used in the cement sector. The Italian Ministerial Decree dated Aug. 31, 1972 ("Norme sui requisiti di accettazione e modalità di prova degli agglomerati cementizi e delle calci idrauliche—Rules on the requisites of acceptance and modalities of testing of cementitious agglomerates and hydraulic limes") defines the requisites of said binders, namely, that they must possess times of start of setting longer than 1 minute, and times of end of setting shorter than 30 minutes, determined on normal paste, and that they must moreover have a minimum resistance to compression at 7 days of at least 13 MPa; further specifications regard the content of $SO_3$ (less than 3.5 wt %) and of MgO (less than 4 wt %). Fast binders are characterized in general by high contents of calcium alluminates; there are moreover known fluoroalluminate-based fast binders (Italian patent No. IT 37815 A/69 and Italian patent No. IT 988018). A preferred example of fast-setting binder is the lime-and-alluminate-based composition described in EP-A-1159233 (incorporated herein for reference) and referred to herein as "Scatto". The fast-setting binder may be used as such or possibly mixed with ordinary cements (defined according to the standard UNI EN 197-1, for example Portland cement (CEM I)), photocatalytic cements, possible further reactive added substances (e.g., anhydrite, silica smoke, added substances of a pozzolanic nature, of Type II, as defined by the standard UNI EN 206).

The fast-setting binder is incorporated in the compositions of the invention in weight percentages with respect to the total dry mix comprised between 15 wt % and 30 wt %, preferably between 20 wt % and 24 wt %.

The binder/aggregates weight ratio, herein meaning by "binder" the sum of fast-setting binder plus the possible ordinary or photocatalytic cement present and the possible further added substances described above, is generally comprised between 0.65 and 1.00, preferably between 0.90 and 0.95.

The fluidifiers/superfluidifiers are used in weight percentages comprised between 0.2 wt % and 4 wt % with respect to the total weight of the binder. Examples of these additives are the compounds of a melaminic, naphthalenic, or acrylic type commonly used in cementitious compositions. They may be used individually or in mixtures containing two or more of them. The fluidifiers/superfluidifiers produced may be indifferently added to the starting dry premix or may be added mixed with the water at the moment of preparation of the mortar.

The setting regulators are used in weight percentages comprised between 0.01 wt % and 0.4 wt % with respect to the total weight of the binder.

By way of non-limiting example, among the setting regulators there may be listed: citric acid, boric acid and tartaric acid.

In addition to the aforesaid components, the premix forming the subject of the present invention may contain various additives to enable fine adaptation of the characteristics of the cement to the specific application required. Examples of said additives may be: waterproofing agents, organic resins, air-entraining agents, expansive agents, etc. Said products are useful but not indispensable for the purposes of the invention.

The compositions identified above are mixed with water to obtain low-viscosity and fast-hardening cementitious mortars. Said mortars form a further subject of the present invention. The ratio of mixing with water can vary widely: non-limiting ranges of reference are comprised between 0.30 and 0.45, preferably between 0.34 and 0.38. By "ratio of mixing with water" or "water/binder ratio" is meant the ratio, respectively, between the quantity of water used for forming the mortar (including the water possibly contributed through the addition of aqueous additives) and the quantity of "binder" present, as defined previously, where the amount of water is the numerator and the amount of binder the denominator.

It is important to note that the mortars according to the present invention reach a high fluidity, without requiring the use of large amounts of water; consequently, it is possible to obtain hardened end products with an excellent resistance thanks to the low water/binder ratio used.

The mortars according to the invention may be produced through any process that envisages mixing of their components: processes and apparatus commonly in use for the formation of cementitious mortars may be employed. The temperature at which mixing of the dry premix with water occurs is generally comprised between 5° C. and 35° C.

The mortars described above present the advantage of an improved fluidity and of a faster development of resistances. A specific subject of the present invention is the use of the mortar described hereinbefore in the production of cementitious products, said production being performed by means of pouring of the mortar in foundry moulds; the technology of moulding of cementitious products by means of pouring of cementitious compositions in general in foundry moulds is described in the patent No. WO03008166, incorporated herein for reference.

By "foundry moulds" are meant all foundry moulds made of foundry earth taken in isolation, or integrated within foundry plants designed for the casting of molten metal and commonly used for the production of metal products. The high degree of fluidity of the mortar obtained according to the invention enables the fluid mass to reach homogeneously all the interstices of the mould, thus enabling production of products that are precise in shape, even in the case of complex and tortuous shapes and ones having a particularly high degree of surface finish. It should be noted that this result is obtained without any need to impress vibrations on the foundry moulds, which are notoriously devoid of systems for the settling of the fluid mass. At the same time, rapid consolidation enables a faster recovery of the hardened product and hence a faster production cycle. Consequently, the advantageous characteristics of fluidity and fast consolidation of the mortar enable an industrially valid exploitation of the method of moulding of products by means of pouring in foundry moulds.

The mortars described in the present patent application, the dry premixes from which they are obtained, the resulting products, and new industrial applications different from the one claimed herein, are the subject of a co-pending patent application filed in the name of the present applicant.

The invention will now be described by means of the following non-limiting examples.

EXPERIMENTAL PART

Characteristics of Known Pourable Mortars

Reference is made to the following widely used pourable mortars:

MC1. mortar with a base of MACFLOW (RHEOMAC 200)—MAC S.p.A.;

MC2. MAPEGROUT COLABILE—MAPEI S.p.A.;

MC3. MALTA ANTIRITIRO REOPLASTICA AUTOLIVELLANTE (SELF-LEVELLING RHEOPLASTIC ANTI-SHRINK MORTAR)—SIRIOBETON A.C.

The mortars referred to above are specifically designed for providing high mechanical resistances, together with characteristics of pourablity. Table 1 below summarizes the performance declared in the technical sheets of the products. In particular, for the binder MC1 the performance for two different compositions is given:

MC1-A) performance declared in paste (mix consisting of binder and water characterized by a water/binder ratio=0.32);

MC1-B) performance measured in mortar (mix consisting of binder, aggregates proportioned according to Füller distribution and water; binder/aggregate ratio=1:1.25, water/binder ratio=0.38).

TABLE 1

Characteristics of known mortars

| Product code | Time [days] | $R_{compression}$ [MPa] | $R_{flexure}$ [MPa] | Rheological characteristics |
|---|---|---|---|---|
| MC1-A (declared) | 1 | 20 | — | Enables very fluid and non-segregatable concretes with a low water/cement ratio to be obtained. |
| | 28 | 65 | — | |
| MC1-B (found) | 0.25 | not measurable | not measurable | Flow time (Marsh cone): 94 s |
| | 1 | 31.4 | 6.2 | |
| | 7 | 58.9 | 8.2 | |
| MC2 | 1 | 35.0 | 5.5 | High degree of fluidity, suitable for application by means of pouring in formwork, without segregation, even in large thicknesses. |
| | 7 | 60.0 | 8.0 | |
| | 28 | 75.0 | 10.0 | |
| MC3 | 7 | — | ≧4 | Pourable mortar for the renewal of concrete. |
| | 28 | ≧65 | — | |

Example 1 (Comparison)

In order to verify the criticality of the granulometric curve of the aggregates made up of two fractions and of the dimensional ratio between the two fractions (such as is the subject of the present invention), reference compositions were obtained containing a different number of fractions of aggregates.

Specifically, three reference compositions (referred to as "Mix 15", "Mix 16", and "Mix 26") were prepared containing a fast-setting binder ("Scatto"), an ordinary Portland cement, and some additives used in cementitious compositions, such as anhydrite, silica-smoke slurry, and superfluidifiers; the aggregates used in the three compositions were characterized by the granulometric distributions given in FIG. 1 and described hereinafter:

Mix 15: granulometric distribution obtained by combining three different fractions of aggregate, characterized by the parameters $x_0$ and n given in Table 2 below. The same table gives, for each fraction, the weight-percentage content referred to the mix of aggregate alone.

TABLE 2

Granulometric fractions used for Mix 15

| | Fractions of aggregate | | |
|---|---|---|---|
| | C | B | D |
| $x_0$ [mm] | 0.23 | 0.73 | 1.33 |
| n | 1.7 | 5.0 | 8.2 |
| $r^2$ | >0.99 | >0.99 | >0.99 |
| content in wt % of aggregate alone in the mix | 67 | 20 | 13 |

For each fraction of aggregate, Table 2 also gives the value of $r^2$ (determination index). Said value, which is always comprised between 0 and 1, is an index of the goodness of an interpolation of discrete data performed by means of a given function. In the specific case, it refers to the interpolation of the experimental data of grain size, performed using the RRSB equation; its value, which is close to 1, indicates the excellent agreement between said equation and the granulometrical curves considered.

Mix 16: granulometric distribution obtained by combining three different fractions of aggregate, characterized by the parameters $x_0$ and n given in Table 3 below. The same table gives, for each fraction, the weight-percentage content referred to the mix of aggregate alone.

TABLE 3

Granulometric fractions used for Mix 16

| | Fractions of aggregate | | |
|---|---|---|---|
| | A | E | D |
| $x_0$ [mm] | 0.27 | 0.97 | 1.33 |
| n | 4.7 | 3.5 | 8.2 |
| $r^2$ | >0.99 | >0.99 | >0.99 |
| content in wt % of aggregate alone in the mix | 66 | 29 | 5 |

Mix 26: granulometric distribution obtained by combining four different fractions of aggregates, characterized by the parameters $x_0$ and n given in Table 4 below. The same table gives, for each fraction, the weight-percentage content referred to the mix of aggregate alone.

TABLE 4

Granulometric fractions used for Mix 26

| | Fractions of aggregate | | | |
|---|---|---|---|---|
| | A | B | F | D |
| $x_0$ [mm] | 0.27 | 0.73 | 2.00 | 1.33 |
| n | 4.7 | 5.0 | 4.7 | 8.2 |
| $r^2$ | >0.99 | >0.99 | >0.99 | >0.99 |
| content in wt % of aggregate alone in the mix | 50 | 20 | 20 | 10 |

The compositions Mix 15, Mix 16 and Mix 26 were mixed with water so as to obtain mortars with water/binder ratios in the region of 0.33-0.36. For each mortar, there were measured, in the fresh state, the volumic mass and the flow time, the latter factor being indicative of the fluidity and measured according to what is specified in what follows.

The mortar, immediately after its preparation, was poured (approximately 1.1 liters) into a metal cone in compliance with the standard UNI EN 445 (Marsh cone). There was then found the flow time of a known and pre-set volume (nominally, 1 liter) of mortar through the nozzle set at the vertex of the cone.

The mortars were then poured to form prisms having dimensions of 40×40×160 mm and in conformance with the standard UNI EN 196-1 (without settling). The mortar was kept in the moulds located in a climatized environment (T=20±2° C.; RH=50±5%) up to removal from the moulds after 2 h 45 min from casting. The specimens were then kept in the same climatized environment up to expiry of the 24 hours. For the conduct of resistance-to-compression tests for longer expiration times, the specimens were set to cure in water at 20±2° C.

On the specimens there was measured the development of resistance to compression at 3, 6 and 24 hours. The results are set forth in Table 5 below.

TABLE 5

Compositions and parameters of the reference mortars

| | Mix 15 | Mix 16 | Mix 26 |
|---|---|---|---|
| Scatto [%] | 15.85 | 15.85 | 19.60 |
| GEM I 52.5 R [%] | 17.10 | 17.10 | 20.00 |
| Anhydrite [%] | 1.30 | 1.30 | 1.70 |
| Silica-smoke slurry (dry substance) [%] | 0.85 | 0.85 | 0.85 |
| Citric acid[(1)] [%] | 0.20 | 0.20 | 0.25 |
| Aggregate (see Tables 2, 3, 4) [%] | 51.70 | 51.70 | 43.10 |
| Water [%] | 12.60 | 12.60 | 14.05 |
| Acrylic superfluidifier (dry substance) [%] | 0.40 | 0.40 | 0.45 |
| Water/binder ratio | 0.36 | 0.36 | 0.33 |
| Volumic mass [kg/m$^3$] | 2210 | 2220 | 2220 |
| Flow time [s] | 180 | 113 | 145 |
| Resistance to compress. [MPa]: 3 h | 3.3 | 3.1 | 2.8 |
| Resistance to compress. [MPa]: 6 h | 13.1 | 12.7 | 12.9 |
| Resistance to compress. [MPa]: 24 h | 20.1 | 19.5 | 25.0 |

[(1)]added in 50% aqueous solution

The compositions of Table 5 were defined so as to minimize the viscosity of the mixes, and consequently the flow times, and at the same time limit any possible phenomena of segregation. In all cases, it may be noted that the flow time (113-180 s) was decidedly unsatisfactory.

Example 2

Figure 2:
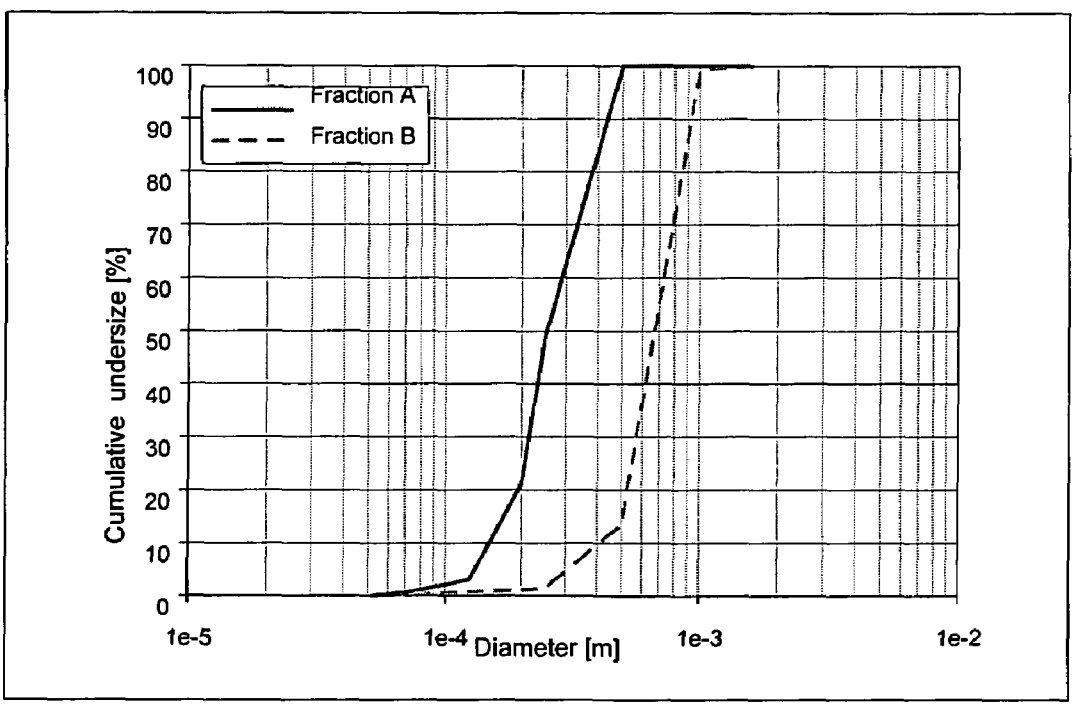
FIG. 2: fractions of aggregate in accordance with the invention, used in Example 2

A mortar was prepared in accordance with the present invention (referred to herein as "MBV"), using amounts of ingredients equivalent to the ones used in the reference examples; however, in this case an aggregate was used, obtained by mixing just two distinct fractions of aggregate, designated in FIG. 2 by the letters A and B. The ratio between the characteristic grain diameters of the two fractions was equal to 2.70.

Table 6 gives the granulometric distribution of the two fractions A and B.

TABLE 6

Granulometric distribution of the mortar MBV

| Diameter (mm) | Fraction A | Fraction B |
|---|---|---|
| 1.6 | 100.0 | 100.0 |
| 1.0 | 100.0 | 99.3 |
| 0.5 | 100.0 | 13.5 |
| 0.25 | 49.4 | 1.4 |
| 0.2 | 21.1 | 1.1 |
| 0.125 | 3.1 | 0.7 |
| 0.075 | 0.8 | 0.4 |
| 0.051 | 0.0 | 0.0 |

Fraction A represents 49 wt % and Fraction B represents 51 wt % with respect to the total aggregates.

Table 7 gives the characteristic parameters of the curves of granulometric distribution illustrated in FIG. 2. The same table gives, for each fraction, the weight-percentage content referred to the mix of aggregate alone.

TABLE 7

Granulometric fractions used for the mortar MBV

| | Fraction A | Fraction B |
|---|---|---|
| $x_0$ | 0.27 | 0.73 |
| n | 4.7 | 5.0 |
| $r^2$ | >0.99 | >0.99 |
| content in wt % of aggregate alone in the mix | 49 | 51 |

From Table 7 it may be noted that the two distributions are characterized by a value of the parameter n>4.0, which confirms the substantial monogranularity of the distributions. The characteristic grain diameters for the two distributions are respectively equal to 0.27 mm and 0.73 mm. The ratio between the characteristic grain diameters of the two distributions is equal to 2.70.

The composition data, the values of volumic mass, of fluidity of the mortar (expressed in terms of flow time through the Marsh cone), and the values of resistance of the product in the hardened state are set forth in Table 8. The determination of these parameters was performed as in Example 1.

TABLE 8

Composition and parameters of the mortar MBV

| | | MBV | |
|---|---|---|---|
| Scatto | [%] | | 18.60 |
| CEM I 52.5 R | [%] | | 19.81 |
| Anhydrite | [%] | | 1.49 |
| Silica-smoke slurry (dry substance) | [%] | | 0.90 |
| Citric acid[1] | [%] | | 0.12 |
| Aggregate | [%] | | 44.20 |
| Water | [%] | | 14.40 |
| Acrylic superfluidifier (dry substance) | [%] | | 0.48 |
| Water/binder ratio | | | 0.35 |
| Volumic mass | [kg/m³] | | 2214 |
| Flow time | [s] | | 58 |
| Resistance to compression | [MPa] | 3 h | 11.4 |
| | | 8 h | 15.6 |
| | | 24 h | 19.0 |
| | | 7 days | 65.6 |
| | | 28 days | 77.3 |

[1]added in 50% aqueous solution

The flow time (58 s, indicating a high degree of fluidity) was completely different from and lower than those measured for the reference compositions (113-180 s). There was thus obtained a fluidity twice or three times that of the reference compositions illustrated in Table 5. Apart from the different grain size of the aggregates, the various compositions tested were substantially equivalent from the standpoints of quality and quantity. In particular, the water/cement ratio used was kept in the region of 0.33-0.36, and the amounts of superfluidifiers were kept in the region of 0.4-0.5 wt %. The marked increases in fluidity of the mortar were thus a consequence of the modifications made in the grain size of the aggregates. It may moreover be noted that to said substantial increase in fluidity there did not correspond any reduction in the development of resistance which, with respect to the reference compositions, remained unvaried at 24 hours and even improved over short times.

The development of resistance over a short time is of primary importance for the purpose of solving the problems addressed by the present invention and widely discussed in the foregoing detailed description.

The values of fluidity observed for the mortar MBV are compatible with its use for forming homogeneous products in foundry moulds, without any application of vibrations for settling the mass. In particular, the resistance observed at 3 hours (>10 MPa) is sufficient to enable the recovery of the solidified product from the mould and its manipulation. Subjected to freezing/thawing tests (according to UNI 7087), the products presented, after 300 cycles, a factor of degradation approaching 1.0, which indicates a good resistance to freezing. The shrinkage data of the samples stored at 20° C. and 50% residual humidity yielded values equivalent to standard mortars.

Example 3

The mortar of Example 2 was used for producing cementitious products by means of pouring in moulds in foundry earth, in an industrial plant normally used for the moulding of metal products.

The apparatus (Disamatic, manufactured by Disa Industries, Herlev DK) has a maximum rate of production of 480 pieces/hour. The time necessary for filling the moulds with the mortar was very similar to what is employed in the case of the casting of molten metal; the filling of the moulds was homogeneous. After 2.5 hours it was possible to recover the hardened product from the moulds; these times are compatible with the running of an economically profitable industrial production cycle. The characteristics of the products produced were the following:

| | |
|---|---|
| Tube (length 500 mm, thickness 11 mm), weight | 10 kg |
| Tube bent at 90°, weight | 10 kg |
| Side element for roadside pavement: | 24 kg |
| Manhole cover: | 20 kg |
| Element for pavement (paving block): | 2.5 kg |

What is claimed is:

1. A production method of cementitious products by means of pouring a cementitious mortar into at least one foundry mould, wherein said cementitious mortar comprises a fast-setting hydraulic binder, fluidifiers and/or superfluidifiers, setting regulators, aggregates, and water, said aggregates being made up of two fractions with different grain size and the ratio between the characteristic grain diameters of the two fractions of aggregates being comprised between 2.2 and 3.2.

2. The method according to claim 1 where, in the mortar, the ratio between the characteristic grain diameters of the two fractions of aggregates is comprised between 2.5 and 3.0.

3. The method according to claim 1, where, in the mortar used, the characteristic grain diameter of one fraction is comprised between 0.2 mm and 0.4 mm, and the characteristic grain diameter of the other fraction is comprised between 0.6 mm and 0.8 mm.

4. The method according to claim 1, where, in the mortar, both of the fractions of aggregates are substantially monogranular.

5. The method according to claim 1, where, in the mortar, each of the two fractions represents approximately 50 wt % with respect to the total aggregates present.

6. The method according to claim 1, where the mortar contains an additive for cementitious mixes.

7. The method according to claim 1, where said additive is at least one selected from the group consisting of: waterproofing agents, organic resins, air-entraining agents, and expansive agents.

8. The method according to claim 1, where the mortar obtained by means of mixing with water of a dry premix comprising a fast-setting hydraulic binder, fluidifiers and/or superfluidifiers, setting regulators, and aggregates, where said aggregates are made up of two fractions having different grain size, and the ratio between the characteristic grain diameters of the two fractions of aggregates is comprised between 2.2 and 3.2.

* * * * *